United States Patent
Bond et al.

(10) Patent No.: US 9,925,706 B2
(45) Date of Patent: Mar. 27, 2018

(54) PROCESS OF PRODUCING A MELT-SPINNABLE FIBER USING THERMOPLASTIC POLYMER AND DESTRUCTURED STARCH

(71) Applicant: The Procter & Gamble Company, Cincinnati, OH (US)

(72) Inventors: Eric Bryan Bond, Maineville, OH (US); Jean-Philippe Marie Autran, Wyoming, OH (US); Larry Neil Mackey, Fairfield, OH (US); Isao Noda, Fairfield, OH (US); Hugh Joseph O'Donnell, Cincinnati, OH (US); Dean Van Phan, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 107 days.

(21) Appl. No.: 14/605,204

(22) Filed: Jan. 26, 2015

(65) Prior Publication Data

US 2015/0137413 A1 May 21, 2015

Related U.S. Application Data

(60) Continuation of application No. 13/457,230, filed on Apr. 26, 2012, now abandoned, which is a division of application No. 10/294,513, filed on Nov. 14, 2002, now abandoned, application No. 14/605,204, filed on Jan. 26, 2015, which is a continuation-in-part of application No. 09/853,131, filed on May 10, 2001, now abandoned, and a continuation-in-part of application No. 09/852,888, filed on May 10, 2001, now abandoned.

(51) Int. Cl.
| | | |
|---|---|---|
| D01D 5/08 | (2006.01) | |
| D01D 5/24 | (2006.01) | |
| D01D 5/28 | (2006.01) | |
| D01D 5/30 | (2006.01) | |
| D01D 5/32 | (2006.01) | |
| D01D 5/34 | (2006.01) | |
| D01D 5/36 | (2006.01) | |
| B29C 47/00 | (2006.01) | |
| D01F 8/06 | (2006.01) | |
| D01F 8/10 | (2006.01) | |
| D01F 8/12 | (2006.01) | |
| D01F 8/14 | (2006.01) | |
| D01F 8/18 | (2006.01) | |
| D04H 1/54 | (2012.01) | |
| D04H 1/4391 | (2012.01) | |

(52) U.S. Cl.
CPC ........... *B29C 47/0004* (2013.01); *D01F 8/06* (2013.01); *D01F 8/10* (2013.01); *D01F 8/12* (2013.01); *D01F 8/14* (2013.01); *D01F 8/18* (2013.01); *D04H 1/4391* (2013.01); *D04H 1/54* (2013.01); *B29K 2003/00* (2013.01); *Y10T 428/2915* (2015.01); *Y10T 428/2929* (2015.01); *Y10T 428/2975* (2015.01); *Y10T 442/612* (2015.04); *Y10T 442/637* (2015.04)

(58) Field of Classification Search
CPC .. D01D 5/08; D01D 5/24; D01D 5/28; D01D 5/30; D01D 5/32; D01D 5/34; D01D 5/36; D01F 8/04; D01F 8/18
USPC .............. 264/171.26, 171.28, 172.1, 172.11, 264/172.12, 172.13, 172.14, 172.15, 264/172.17, 172.18, 211.16
See application file for complete search history.

(56) References Cited

U.S. PATENT DOCUMENTS

| | | |
|---|---|---|
| 4,139,699 A | 2/1979 | Hernandez et al. |
| 4,853,168 A | 8/1989 | Eden et al. |
| 5,316,578 A | 5/1994 | Buehler et al. |
| 5,417,679 A | 5/1995 | Toms et al. |
| 5,422,387 A | 6/1995 | Toms et al. |
| 5,425,987 A | 6/1995 | Shawver et al. |

(Continued)

FOREIGN PATENT DOCUMENTS

| | | |
|---|---|---|
| EP | 1 035 163 A2 | 9/2000 |
| EP | 1 035 239 A2 | 9/2000 |

(Continued)

OTHER PUBLICATIONS

Fringant, C., et al., "Preparation of Mixed Esters of Starch or Use of an External Plasticizer: Two Different Ways to Change the Properties of Starch Acetate Films", Carbohydrate Polymers 35 (1998) 97-106, Elsevier Science, Ltd.

(Continued)

*Primary Examiner* — Leo B Tentoni
(74) *Attorney, Agent, or Firm* — Brent M. Peebles

(57) ABSTRACT

A melt spinnable fiber is provided that comprises a first component comprising a thermoplastic polymer, and a second component comprising thermoplastic starch where the second component is not encompassed by another component or components or if encompassed by another component or components then the second component encompasses a hollow core. A particular use of such a fiber is for removal of the second component in the presence of a solvent in order to produce fibers with desired properties. An agent may be present in the second component for controlling the rate of removal of the second component thereby allowing for physical manipulation of the fiber prior to complete removal of the component. The invention is also directed to nonwoven webs and disposable articles comprising the fibers.

3 Claims, 5 Drawing Sheets

(56) References Cited

U.S. PATENT DOCUMENTS

| | | |
|---|---|---|
| 5,516,815 A | 5/1996 | Buehler et al. |
| 5,593,768 A | 1/1997 | Gessner |
| 5,593,778 A | 1/1997 | Kondo et al. |
| 5,703,160 A | 12/1997 | Dehennau et al. |
| 5,814,404 A | 9/1998 | Rutherford et al. |
| 5,851,937 A | 12/1998 | Wu et al. |
| 5,852,114 A * | 12/1998 | Loomis ............ C08L 29/04 523/128 |
| 5,874,486 A | 2/1999 | Bastioli et al. |
| 5,876,650 A | 3/1999 | Burlone et al. |
| 5,945,480 A | 8/1999 | Wang et al. |
| 5,985,776 A | 11/1999 | Bertrand et al. |
| 6,045,908 A | 4/2000 | Nakajima et al. |
| 6,096,809 A | 8/2000 | Lorcks et al. |
| 6,117,925 A | 9/2000 | Tomka |
| 6,218,321 B1 | 4/2001 | Lorcks et al. |
| 6,376,072 B1 | 4/2002 | Evans et al. |
| 6,451,170 B1 | 9/2002 | Anderson et al. |
| 6,506,873 B1 | 1/2003 | Ryan et al. |

FOREIGN PATENT DOCUMENTS

| | | |
|---|---|---|
| EP | 1217106 A1 | 6/2002 |
| EP | 1217107 A1 | 6/2002 |
| EP | 0 814 184 A | 12/2012 |
| GB | 1 247 474 | 9/1971 |
| JP | 62-28410 | 2/1987 |
| JP | 04100913 | 4/1992 |
| JP | 96027627 A | 1/1996 |
| JP | 97041224 | 2/1997 |
| JP | 9276331 | 10/1997 |
| JP | 1008364 A | 1/1998 |
| JP | 2011-286829 | 10/1999 |
| JP | 2001-049533 | 2/2001 |
| WO | WO 1995/033874 A | 12/1995 |
| WO | WO 2001/46506 A2 | 6/2001 |
| WO | WO 2001/48078 A1 | 7/2001 |
| WO | WO 2001/49912 A1 | 7/2001 |

OTHER PUBLICATIONS

Glenn, G. M., et al., "Starch, Fiber and $CaCO_3$ Effects on the Physical Properties of Foams Made by a Baking Process," Industrial Crops and Products 14 (2001) 201-212, Elsevier Science, Ltd.

Jandura, P., et al., "Thermal Degradation Behavior of Cellulose Fibers Partially Esterified with Some Long Chain Organic Acids", Polymer Degradation and Stability 70 (2000) 387-394, Elsevier Science, Ltd.

International Search Report for PCT/US2002/36593 dated Jul. 25, 2003.

* cited by examiner

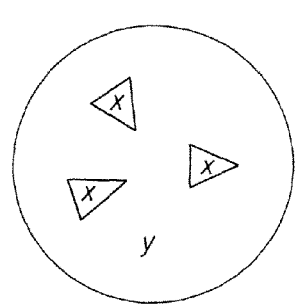 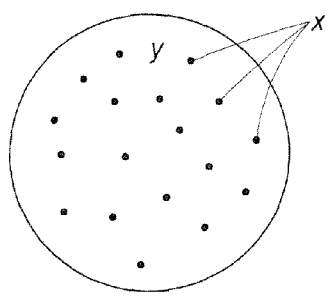 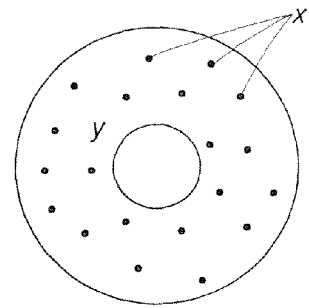
Fig. 5A  Fig. 5B  Fig. 5C
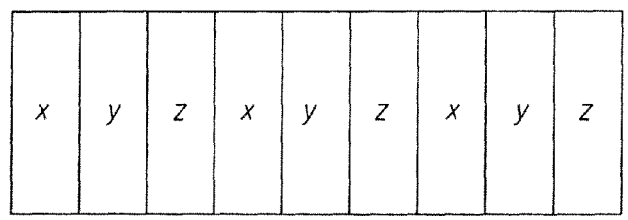
Fig. 6

PROCESS OF PRODUCING A MELT-SPINNABLE FIBER USING THERMOPLASTIC POLYMER AND DESTRUCTURED STARCH

CROSS REFERENCE TO RELATED APPLICATION

This application is a continuation of Ser. No. 13/457,230, filed Apr. 26, 2012, now abandoned, which is a divisional of Ser. No. 10/294,513, filed Nov. 14, 2002, now abandoned and a continuation-in-part of Ser. No. 09/853,131, filed May 10, 2001, now abandoned, and a continuation-in-part of Ser. No. 09/852,888, filed May 10, 2001, now abandoned.

FIELD OF THE INVENTION

The present invention relates to fibers having a diameter of less than 200 microns comprising a first component comprising a thermoplastic polymer and a second component comprising thermoplastic starch wherein the second component is not encompassed by another component or components or if encompassed by another component or components then the second component encompasses a hollow core. Such fibers allow for removal of the second component by exposure to a solvent for the second component.

BACKGROUND OF THE INVENTION

Current woven and nonwoven materials are commonly produced from multicomponent fibers where one component is removed in order to produce fibers with desired diameter or denier, such as in a splittable or islands-in-a-sea configuration for use in synthetic leather, for example. Many of materials removed are derived from petroleum, most notably polyesters or nylons, through treatment processes that are not environmentally friendly. These polymeric materials are not biodegradable and potentially pose a long term problem in waste disposal systems. There is a need for a removable component in these multicomponent fibers that is more environmentally friendly, affordable and that can be made in conjunction with conventional thermoplastic polymers that can deliver softness at affordable costs.

Multicomponent fibers that include starch as a component are desirable since starch is a renewable raw material, of low cost, and is independent of petroleum products. It is important that fibers having starch as a component be processible on standard equipment and use existing technology.

The present invention addresses this need for a removable fiber component that is environmentally friendly as well as providing good processing characteristics during manufacture.

SUMMARY OF THE INVENTION

The present invention is directed to melt spinnable fibers comprising a first component comprising a thermoplastic polymer and a second component comprising thermoplastic starch wherein the second component is not encompassed by another component or components or if encompassed by another component or components then the second component encompasses a hollow core. Such a configuration allows for the second component to be removed by exposure to a second-component-removing solvent.

The configuration of the multicomponent fibers can be sheath-core, islands-in-the-sea, side-by-side, ribbon, segmented pie, for example, or various combination thereof. In a sheath-core configuration, for example, the second component is the sheath, and is removable by exposure to a second-component-removing solvent. In a configuration having a hollow core, the second component may encompass the hollow core.

An agent may be present in the second component that affects the rate of removal of the second component in the second-component-removing solvent. Such control of the rate of second component removal allows the fiber to be physically manipulated, such as elongated or formed into a fabric, before the component is fully removed. Such a process allows for production of fibers with a desired diameter or denier, for example.

Such compositions are cost-effective and suitable for use in commercially available equipment, while possessing a significant amount of the total composition that is biodegradable, thus eliminating hazardous and non-environmentally friendly materials from such processes. The present invention is directed toward making durable fibers for a woven, knitted or other suitable fabric making process. The present invention is also directed to nonwoven webs and disposable articles comprising said fibers.

BRIEF DESCRIPTION OF THE DRAWINGS

These and other features, aspects, and advantages of the present invention will become better understood with regard to the following description, appended claims, and accompanying drawings where:

FIG. 1A illustrates a typical concentric sheath-core configuration.

FIG. 1B illustrates a sheath-core configuration with a solid core and shaped continuous sheath.

FIG. 1C illustrates a sheath-core configuration with a hollow core, core x, and continuous sheath y.

FIG. 1D illustrates a sheath-core configuration with a hollow core, core x, and shaped continuous sheath y.

FIG. 1E illustrates a discontinuous sheath-core configuration.

FIG. 1F illustrates a further discontinuous sheath-core configuration.

FIG. 1G illustrates a sheath-core configuration with hollow core surrounded by component X and discontinuous sheath component Y.

FIG. 1H illustrates a further sheath-core configuration with hollow core surrounded by component X and discontinuous sheath component Y.

FIG. 1I illustrates an eccentric sheath-core configuration.

FIG. 2A illustrates a solid eight segmented pie configuration.

FIG. 2B illustrates a hollow eight segmented pie configuration.

FIG. 4A illustrates a side-by-side configuration.

FIG. 4B illustrates a side-by-side configuration with a rounded adjoining line. The adjoining line is where two components meet. Component Y is present in a higher amount than Component X.

FIG. 4C illustrates a side-by-side configuration with component Y positioned on both sides of Component X with a rounded adjoining line.

FIG. 4D illustrates a side-by-side configuration with component Y positioned on both sides of Component X.

FIG. 4E illustrates a shaped side-by-side configuration with component Y positioned on the tips of component X.

FIG. 5A-FIG. 5C provide schematic drawings illustrating cross-sectional views of multicomponent fibers having an islands-in-the-sea configuration.

FIG. 5A illustrates a solid islands-in the-sea configuration with component X surrounded by component Y. Component X may be triangular in shape.

FIG. 5B illustrates a solid islands-in the-sea configuration with component X surrounded by component Y.

FIG. 5C illustrates a hollow islands-in the-sea configuration with component X surrounded by component Y.

FIG. 6 provides a schematic drawing illustrating a cross-sectional view of a tricomponent fiber having a ribbon configuration.

DETAILED DESCRIPTION OF THE INVENTION

Figure 1A:
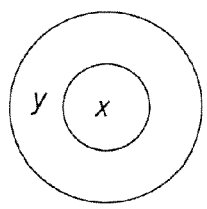
FIG. 1A-FIG. 1I provide schematic drawings illustrating cross-sectional views of multicomponent fibers.

All percentages, ratios and proportions used herein are by weight percent of the composition, unless otherwise specified. All average values are calculated "by weight" of the composition or components thereof, unless otherwise expressly indicated. "Average molecular weight", or "molecular weight" for polymers, unless otherwise indicated, refers to number average molecular weight. Number average molecular weight, unless otherwise specified, is determined by gel permeation chromatography. All patents or other publications cited herein are incorporated herein by reference with respect to all text contained therein for the purposes for which the reference was cited. Inclusion of any such patents or publications is not intended to be an admission that the cited reference is citable as prior art or that the subject matter therein is material prior art against the present invention.

The specification contains a detailed description of (1) materials for the fibers of the present invention, (2) configuration of the fibers, (3) material properties of the fiber, (4) processes, and (5) articles
(1) Materials
First Component Material: Thermoplastic Polymers Suitable melting temperatures of the thermoplastic polymers are from about 60° C. to about 300° C. or, in some embodiments from about 80° C. to about 250° C. or from 100° C.-215° C. Thermoplastic polymers having a melting temperature (Tm) above 250° C. may be used if plasticizers or diluents or other polymers are used to lower the observed melting temperature, such that the melting temperature of the composition of the thermoplastic polymer-containing component is within the above ranges. It may be desired to use a thermoplastic polymer having a glass transition (Tg) temperature of less than 0° C. The thermoplastic polymer component has rheological characteristics suitable for melt spinning. The molecular weight of the polymer should be sufficiently high to enable entanglement between polymer molecules and yet low enough to be melt spinnable. For melt spinning, suitable thermoplastic polymers can have molecular weights about 1,000,000 g/mol or below and, in some embodiments from about 5,000 g/mol to about 800,000 g/mol, or from about 10,000 g/mol to about 700,000 g/mol or from about 20,000 g/mol to about 500,000 g/mol.

The thermoplastic polymers should be able to solidify fairly rapidly, preferably under extensional flow, as typically encountered in known processes for staple fibers (spin draw process), continuous filaments, or spunbond continuous filament processes, and desirably can form a thermally stable fiber structure. "Thermally stable fiber structure" as used herein is defined as not exhibiting significant melting or dimensional change at 25° C. and ambient atmospheric pressure over a period of 24 hours at 50% relative humidity when the fibers are placed in the environment within five minutes of their formation. Dimensional changes in measured fiber diameter greater than 25% difference, using as a basis the corresponding, original fiber diameter measurement, would be considered significant. If the original fiber is not round, the shortest diameter should be used for the calculation. The shortest diameter should be used for the post-24 hour measurement also.

Suitable thermoplastic polymers include polyolefins or polyolefin copolymers such as polyethylene or copolymers thereof, including low, high, linear low, or ultra low density polyethylene or copolymer thereof, polypropylene or copolymers thereof, including atactic polypropylene; polybutylene or copolymers thereof; polyamides or copolymers thereof, such as Nylon 6, Nylon 11, Nylon 12, Nylon 46, Nylon 66; polyesters or copolymers thereof, such as polyethylene terephalates; olefin carboxylic acid copolymers such as ethylene/acrylic acid copolymer, ethylene/maleic acid copolymer, ethylene/methacrylic acid copolymer, ethylene/vinyl acetate copolymers or combinations thereof; polyacrylates, polymethacrylates, and their copolymers such as poly(methyl methacrylates). Other nonlimiting examples of polymers include polycarbonates, polyvinyl acetates, poly(oxymethylene), styrene copolymers, polyacrylates, polymethacrylates, poly(methyl methacrylates), polystyrene/methyl methacrylate copolymers, polyetherimides, polysulfones, or combinations thereof. In some embodiments, thermoplastic polymers include polypropylene, polyethylene, polyamides, polyvinyl alcohol, ethylene vinyl alcohol, ethylene acrylic acid, polyolefin carboxylic acid copolymers, polyesters, and combinations thereof.

Biodegradable thermoplastic polymers are also suitable for use herein. Biodegradable materials are susceptible to being assimilated by microorganisms such as molds, fungi, and bacteria when the biodegradable material is buried in the ground or otherwise comes in contact with the microorganisms including contact under environmental conditions conducive to the growth of the microorganisms. Suitable biodegradable polymers also include those biodegradable materials which are environmentally degradable using aerobic or anaerobic digestion procedures, or by virtue of being exposed to environmental elements such as sunlight, rain, moisture, wind, temperature, and the like. The biodegradable thermoplastic polymers can be used individually or as a combination of biodegradable or non-biodegradable polymers. Biodegradable polymers include polyesters containing aliphatic components. Among the polyesters are ester polycondensates containing aliphatic constituents and poly(hydroxycarboxylic) acid. The ester polycondensates include diacids/diol aliphatic polyesters such as polybutylene succinate, polybutylene succinate co-adipate, aliphatic/aromatic polyesters or copolyester such as terpolymers made of butylenes diol, adipic acid and terephtalic acid. The poly(hydroxycarboxylic) acids include lactic acid based homopolymers and copolymers, polyhydroxybutyrate (PHB), or other polyhydroxyalkanoate homopolymers and copolymers. Such polyhydroxyalkanoates include copolymers of PHB with higher chain length monomers, such as C6-C12, and higher.

An example of a suitable commercially available poly lactic acid is NATUREWORKS from Cargill Dow and LACEA from Mitsui Chemical. An example of a suitable commercially available diacid/diol aliphatic polyester is the polybutylene succinate/adipate copolymers sold as BIONOLLE 1000 and BIONOLLE 3000 from the Showa High Polymer Company, Ltd. (Tokyo, Japan). An example of a suitable commercially available aliphatic/aromatic copolyester is the poly(tetramethylene adipate-co-terephthalate) sold as EASTAR BIO Copolyester from Eastman Chemical or ECOFLEX from BASF.

The selection of the polymer and amount of polymer will effect the softness, texture, and properties of the final product as will be understood by those or ordinary skill in the art. The thermoplastic polymer component can contain a single polymer species or a blend of two or more non-starch thermoplastic polymers. Additionally, other materials can be present in the thermoplastic polymer component. Typically, thermoplastic polymers are present in an amount of from about 51% to 100%, preferably from about 60% to about 95%, more preferably from about 70% to about 90%, by total weight of the thermoplastic polymer component.

Second Component Material: Thermoplastic Starch

The present invention relates to the use of starch, a low cost naturally occurring biopolymer. The starch used in the present invention is thermoplastic, destructured starch. The term "destructurized starch" is used to mean starch that is no longer in its naturally occurring granular structure. The term "thermoplastic starch" or "TPS" is used to mean starch with a plasticizer for improving its thermoplastic flow properties so that it may be able to be spun into to fibers.

Natural starch does not melt or flow like conventional thermoplastic polymers. Since natural starch generally has a granular structure, it needs to be "destructurized", or "destructured", before it can be melt processed and spun like a thermoplastic material. Without intending to be bound by theory, the granular structure of starch is characterized by granules comprising an structure of discrete amylopectin and amylose regions in a starch granule. This granular structure is broken down during destructurization, which can be followed by observing a volume expansion of the starch component in the presence of the solvent or plasticizer. Starch undergoing destructuring in the presence of the solvent or plasticizer also typically has an increase in viscosity versus non-destructured starch with the solvent or plasticizer. The resulting destructurized starch can be in gelatinized form or, upon drying and or annealing, in crystalline form, however once broken down the natural granular structure of starch will not, in general, return. It is desirable that the starch be fully destructured such that no lumps impacting the fiber spinning process are present. The destructuring agent used to destructure the starch may remain with the starch during further processing, or may be transient, in that it is removed such that it does not remain in the fiber spun with the starch.

Starch can be destructured in a variety of different ways. The starch can be destructurized with a solvent. For example, starch can be destructurized by subjecting a mixture of the starch and solvent to heat, which can be under pressurized conditions and shear, to gelatinize the starch, leading to destructurization. Solvents can also act as plasticizers and may be desirably retained in the composition to perform as a plasticizer during later processing. A variety of plasticizing agents that can act as solvents to destructure starch are described herein. These include the low molecular weight or monomeric plasticizers, such as but not limited to hydroxyl-containing plasticizers, including but not limited to the polyols, e.g. polyols such as mannitol, sorbitol, and glycerin. Water also can act as a solvent for starch, and can be used to destructurize the starch by dissolving it in water.

For starch to flow and be melt spinnable like a conventional thermoplastic polymer, it should have plasticizer present. If the destructuring agent is removed, it is the nature of the starch to in general remain destructured, however a plasticizer should be added to or otherwise included in the starch component to impart thermoplastic properties to the starch component in order to facilitate fiber spinning. Thus, the plasticizer present during spinning may be the same one used to destructure the starch. Alternately, especially when the destructuring agent is transient as described above, a separate or additional plasticizer may be added to the starch. Such additional to plasticizer can be added prior to, during, or after the starch is destructured, as long as it remains in the starch for the fiber spinning step.

Suitable naturally occurring starches can include, but are not limited to, corn starch, potato starch, sweet potato starch, wheat starch, sago palm starch, tapioca starch, rice starch, soybean starch, arrow root starch, bracken starch, lotus starch, cassava starch, waxy maize starch, high amylose corn starch, and commercial amylose powder. Blends of starch may also be used. Though all starches are useful herein, the present invention is most commonly practiced with natural starches derived from agricultural sources, which offer the advantages of being abundant in supply, easily replenishable and inexpensive in price. Naturally occurring starches, particularly corn starch, wheat starch, potato starch and waxy maize starch, are the preferred starch polymers of choice due to their economy and availability.

Modified starch may also be used. Modified starch is defined as non-substituted, or substituted, starch that has had its native molecular weight characteristics changed (i.e. the molecular weight is changed but no other changes are necessarily made to the starch). Molecular weight can be modified, preferably reduced, by any technique numerous of which are well known in the art. These include, for example, chemical modifications of starch by, for example, acid or alkali hydrolysis, acid reduction, oxidative reduction, enzymatic reduction, physical/mechanical degradation (e.g., via the thermomechanical energy input of the processing equipment), or combinations thereof. The thermomechanical method and the oxidation method offer an additional advantage when carried out in situ. The exact chemical nature of the starch and molecular weight reduction method is not critical as long as the average molecular weight is provided at the desired level or range. Such techniques can also reduce molecular weight distribution.

Natural, unmodified starch generally has a very high average molecular weight and a broad molecular weight distribution (e.g. natural corn starch has an average molecular weight of up to about 60,000,000 grams/mole (g/mol)). It is desirable to reduce the molecular weight of the starch for use in the present invention. Molecular weight reduction can be obtained by any technique known in the art, including those discussed above. Ranges of molecular weight for destructured starch or starch blends added to the melt can be from about 3,000 g/mol to about 8,000,000 g/mol, preferably from about 10,000 g/mol to about 5,000,000 g/mol, and more preferably from about 20,000 g/mol to about 3,000,000 g/mol.

Optionally, substituted starch can be used. Chemical modifications of starch to provide substituted starch include, but are not limited to, etherification and esterification. For example, methyl, ethyl, or propyl (or larger aliphatic groups) can be substituted onto the starch using conventional etherification and esterification techniques as well known in the art. Such substitution can be done when the starch is in natural, granular form or after it has been destructured. Substitution can reduce the rate of biodegradability of the starch, but can also reduce the time, temperature, shear, and/or pressure conditions for destructurization. The degree of substitution of the chemically substituted starch is typically, but not necessarily, from about 0.01 to about 3.0, and can also be from about 0.01 to about 0.06.

Typically, the thermoplastic starch comprises from about 51% to about 100%, preferably from about 60% to about 95%, more preferably from about 70% to about 90% by weight of the thermoplastic starch component. The ratio of the starch component to the thermoplastic polymer will determine the percent of thermoplastic starch in the bicomponent fiber component. The weight of starch in the composition includes starch and its naturally occurring bound water content. The term "bound water" means the water found naturally occurring in starch and before mixing of starch with other components to make the composition of the present invention. The term "free water" means the water that is added in making the composition of the present invention. A person of ordinary skill in the art would recognize that once the components are mixed in a composition, water can no longer be distinguished by its origin. Natural starch typically has a bound water content of about 5% to about 16% by weight of starch.

Optional Second Component Material for Controlling the Rate of Starch Removal

An agent may be present in the second component in combination with the starch that allows control of the rate of starch release and thereby, the amount of starch released when the multicomponent fiber is placed in a solvent such as water, for example. Examples of such agents include acid substituted vinyl polymers such as ethylene acrylic acid which is commercially available as PRIMACOR from Dow Chemical Co., polyolefin carboxylic acid copolymers such as ethylene acrylic acid copolymer, ethylene maleic acid copolymer, ethylene methacrylic acid copolymer, ethylene acrylic acid copolymer, and combinations thereof, a polyhydroxyetherester, a polyhydroxyetheramide such as the BLOX series of epoxy-based thermoplastic resins from Dow Chemical Co., and aliphatic or aromatic carboxylic acids or carboxyamides having a melting temperature above room temperature (25° C.) and below the upper processing temperature of thermoplastic starch of about 300° C. and a minimum boiling point temperature greater than 150° C. Examples include aliphatic saturated or unsaturated C8-C22 carboxylic acids such as to caprylic, oleic, palmitic, stearic, linoleic, linolenic, ricinoleic, erucic acids, or the corresponding fatty acid alcohols or amides of the fatty acids listed above, in particular, mono-,di-, or tri-glycerides of the said fatty acids. Examples of suitable aliphatic or aromatic carboxyamides are stearamide, benzamide, or propionamide, for example. In particular embodiments of the invention, ethylene acrylic acid (EAA), a polyhydroxyetherester (PHEE), a polyhydroxyetheramide (PHEA), or a combination thereof is an agent present in the second component for controlling the rate of starch removal.

Such an agent is present in an amount of about 1% up to 50% by weight of the second component and, in alternative embodiments, 2, 5, 10, 15, 20, 25, 30, 35, or 40% of the weight of the second component. In general, a greater amount of agent slows the rate of starch removal.

Plasticizer

One or more plasticizers can be used in the present invention to destructurize the starch and enable the starch to flow, i.e. create a thermoplastic starch. As discussed above, a plasticizer may be used as a destructuring agent for starch. That plasticizer may remain in the destructured starch component to function as a plasticizer for the thermoplastic starch, or may be removed and substituted with a different plasticizer in the thermoplastic starch component. The plasticizers may also improve the flexibility of the final products, which is believed to be due to the lowering of the glass transition temperature of the composition.

A plasticizer or diluent for the thermoplastic polymer component may be present to lower the polymer's melting temperature, modify flexibility of the final product, or improve overall compatibility with the thermoplastic starch blend. Furthermore, thermoplastic polymers with higher melting temperatures may be used if plasticizers or diluents are present which suppress the melting temperature of the polymer.

In general, the plasticizers should be substantially compatible with the polymeric components of the present invention with which they are intermixed. As used herein, the term "substantially compatible" means when heated to a temperature above the softening and/or the melting temperature of the composition, the plasticizer is capable of forming a homogeneous mixture with polymer present in the component in which it is intermixed.

The plasticizers herein can include monomeric compounds and polymers. The polymeric plasticizers will typically have a molecular weight less than 500,000 g/mol. Polymeric plasticizers can include block copolymers and random copolymers, including terpolymers thereof. In certain embodiments, the plasticizer has a low molecular weight plasticizer, for example a molecular weight of about 20,000 g/mol or less, or about 5,000 g/mol or less, or about 1,000 g/mol or less. The plasticizers may be used alone or more than one plasticizer may be used in any particular component of the present invention.

The plasticizer can be, for example, an organic compound having at least one hydroxyl group, including polyols having two or more hydroxyls. Nonlimiting examples of useful hydroxyl plasticizers include sugars such as glucose, sucrose, fructose, raffinose, maltodextrose, galactose, xylose, maltose, lactose, mannose erythrose, and pentaerythritol; sugar alcohols such as erythritol, xylitol, malitol, mannitol and sorbitol; polyols such as glycerol (glycerin), ethylene glycol, propylene glycol, dipropylene glycol, butylene glycol, hexane triol, and the like, and polymers thereof; and mixtures thereof. Suitable plasticizers especially include glycerine, mannitol, and sorbitol.

Also useful herein are hydroxyl polymeric plasticizers such as poloxomers (polyoxyethylene/polyoxypropylene block copolymers) and poloxamines (polyoxyethylene/polyoxypropylene block copolymers of ethylene diamine). These copolymers are available as PLURONIC® from BASF Corp., Parsippany, N.J. Suitable poloxamers and poloxamines are available as SYNPERONIC® from ICI Chemicals, Wilmington, Del., or as TETRONIC® from BASF Corp., Parsippany, N.J. Also suitable for use are hydroxy-containing polymers such as polyvinyl alcohol, ethylene vinyl alcohol, and copolymers and blends thereof.

Also suitable for use herein are hydrogen bond forming organic compounds, including those which do not have hydroxyl group, including urea and urea derivatives; anhydrides of sugar alcohols such as sorbitan; animal proteins such as gelatin; vegetable proteins such as sunflower protein, soybean proteins, cotton seed proteins; and mixtures thereof. Other suitable plasticizers are phthalate esters, dimethyl and diethylsuccinate and related esters, glycerol triacetate, glycerol mono and diacetates, glycerol mono, di, and tripropionates, butanoates, stearates, lactic acid esters, citric acid esters, adipic acid esters, stearic acid esters, oleic acid esters, and other father acid esters which are biodegradable. Aliphatic acids such as ethylene acrylic acid, ethylene maleic acid, butadiene acrylic acid, butadiene maleic acid, propylene acrylic acid, propylene maleic acid, and other hydrocarbon based acids are further examples of plasticizers.

When high processing temperature thermoplastic polymers are used, such as with polyamides and polyesters, for example, the starch plasticizer must be carefully chosen so that its vaporization temperature is above the processing temperature of the multicomponent fiber. Plasticizers may be blended together to produce vaporization temperatures above either one alone, commonly referred to as boiling point elevation. A good example of a high boiling point starch plasticizer would be glycerol, which has a vaporization temperature of 290° C.

The amount of plasticizer is dependent upon the molecular weight and amount of starch and the affinity of the plasticizer for the starch or thermoplastic polymer. An amount that effectively plasticizes the starch can be used. The plasticizer should sufficiently plasticize the starch component so that it can be processed effectively to form fibers. Generally, the amount of plasticizer increases with increasing molecular weight of starch. Typically, the plasticizer can be present in an amount of from about 2% to about 70%, and can also be from about 5% to about 55%, or from about 10% to about 50% of the component into which it is intermixed. A polymer incorporated into the starch component that functions as a plasticizer for the starch shall be counted as part of the plasticizer constituent of that component of the present invention. Plasticizer is optional for the thermoplastic polymer components in the present invention and can be used at any effective levels, including the ranges above, and amounts below 2% are also included.

Optional Materials

Optionally, other ingredients may be incorporated into the first or second component compositions. These optional ingredients may be present in quantities of 49% or less, or in alternative embodiments, from about 0.1% to about 30%, or from about 0.1% to about 10% by weight of the component. The optional materials may be used to modify the processability and/or to modify physical properties such as elasticity, tensile strength and modulus of the final product. Other benefits include, but are not limited to, stability including oxidative stability, brightness, color, flexibility, resiliency, workability, processing aids, viscosity modifiers, and odor control. Optional ingredients include nucleating agents, salts, slip agents, crystallization accelerators or retarders, odor masking agents, cross-linking agents, emulsifiers, surfactants, cyclodextrins, lubricants, other processing aids, optical brighteners, antioxidants, flame retardants, dyes, pigments, fillers, proteins and their alkali salts, waxes, tackifying resins, extenders, wet-strength resins, or mixtures thereof. Processing aids include magnesium stearate or, particularly in the starch component, ethylene acrylic acid, commercially available from Dow Chemical Co. as PRIMACOR.

(2) Configuration

The multiconstituent, multicomponent fibers of the present invention may be in several different configurations as long as the second component is not encompassed by another to component or components or if encompassed by another component or components then the second component encompasses a hollow core. Constituent, as used herein, is defined as meaning the chemical species of matter or the material. Multiconstituent, as used herein, is defined to mean a fiber or component thereof containing more than one chemical species or material. The fibers will be multicomponent in configuration prior to removal of a second component. Component, as used herein, is defined as a separate part of the fiber that has a spatial relationship to another part of the fiber. The term multicomponent, as used herein, is defined as a fiber having more than one separate part in spatial relationship to one another. The term multicomponent includes bicomponent, which is defined as a fiber having two separate parts in a spatial relationship to one another at the exit from the extrusion equipment. The different components of multicomponent fibers are arranged in substantially distinct regions across the cross-section of the fiber and extend continuously along the length of the fiber.

The multicomponent fibers may have two, three, four or more components, as long as the second component is not encompassed by another component or components or if encompassed by another component or components then the second component encompasses a hollow core. Accordingly, reference to a first component and a second component is not meant to exclude other components, unless otherwise expressly indicated. The drawings provide reference to a component, x, y, z, and w, for example. Components z and w may be third and fourth components and may comprise another thermoplastic polymer or thermoplastic blend, for example that provides enhanced physical properties beyond the combination of a first and second component.

In one embodiment, the second component comprising the thermoplastic starch surrounds the first component such as in, for example, a sheath-core configuration where the sheath is the second component and the core is the first component.

In a further embodiment, the second component comprising the thermoplastic starch surrounds the first component such as in, for example, an islands-in-a-sea configuration where the islands are the first component and the sea is the second component.

FIG. 1A-FIG. 9 provide schematic drawings illustrating cross-sectional views of various configurations of multicomponent fibers. A combination of one or more configurations is also an aspect of the present invention. A configuration where the second component is not encompassed by another component or components allows the second component to be exposed to a solvent when the fiber is placed in the solvent. For example, in FIG. 1A, FIG. 1B, FIG. 1I, FIG.

Figure 7:
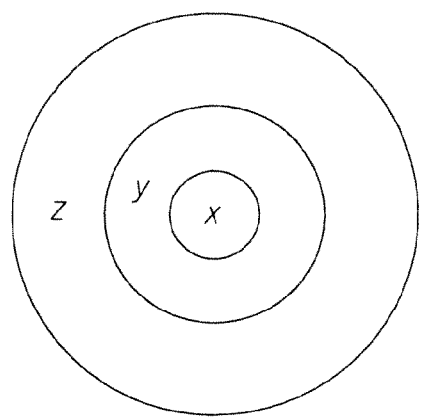
FIG. 7 provides a schematic drawing illustrating a cross-sectional view of a tricomponent fiber having a concentric sheath-core configuration with component X comprising the solid core, component Y comprising the inside continuous sheath, and component Z comprising the outside continuous sheath.
Figure 8:
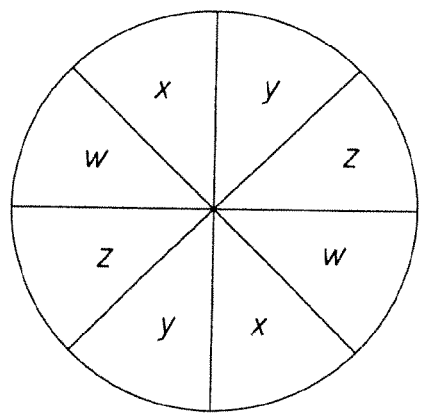
FIG. 8 provides a schematic drawing illustrating a cross-sectional view of a multicomponent fiber having a solid eight segmented pie configuration.
Figure 9:
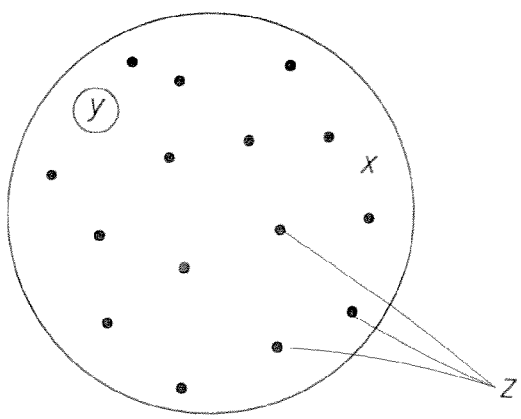
FIG. 9 provides a schematic drawing illustrating a cross-sectional view of a tricomponent to fiber having a solid islands-in-the-sea configuration. Component X surrounds a single island of component Y and a plurality of islands of component Z.

5A, FIG. 5B, FIG. 5C, the second component is y; in FIG. 1E-FIG. 1H, FIG. 2A, FIG. 2B, FIG. 3, FIG. 4A-FIG. 4E, the second component is either x or y; in FIG. 6, the second component is either x, y, or z; in FIG. 7, the second component is z; in FIG. 8, the second component is wither x, y, z, or w; or in FIG. 9, the second component is x. A configuration where the second component is encompassed by another component or components and the second component encompasses a hollow core also allows the second component to be exposed to a solvent when the fiber is placed in the solvent since, in such a configuration, solvent may reach the hollow core. For example, in FIG. 1C or FIG. 1D, the second component may be x or y. When the second component is x in FIG. 1C or FIG. 1D, solvent has access to the hollow core and starch may be removed from component x by the solvent.

The weight ratio of the second component to the first component can be from about 5:95 to about 95:5. In alternate embodiments, the ratio is from about 10:90 to about 65:35 or from about 15:85 to about 50:50.

The fibers of the present invention may also be splittable fibers. Splitting may occur by a mechanical, thermodynamic, hydrodynamic or chemical means during or after the removal of the second component or by fluid induced distortion.

A plurality of microfibrils may also result from the present invention. The microfibrils are very fine fibers contained within a multi-constituent monocomponent or multicomponent fiber. The plurality of polymer microfibrils have a cable-like morphological structure and longitudinally extend within the fiber, which is along the fiber axis. The microfibrils may be continuous or discontinuous. Microfibrils are formed in the present invention as a result of the removal of the second component in a solvent. The thermoplastic polymer is present in a sufficient amount to generate a co-continuous phase morphology such that the polymer microfibrils may form. Typically, greater than 15%, preferably from about 15% to about 90%, more preferably from about 25% to about 80%, and more preferably from about 35% to about 70% of polymer is desired in the first component for microfibril formation. A "co-continuous phase morphology" is found when the microfibrils are substantially longer than the diameter of the fiber. Microfibrils are typically from about 0.1 micrometers to about 10 micrometers in diameter while the fiber typically has a diameter of from about (10 times the microfibril) 10 micrometers to about 50 micrometers. In addition to the amount of polymer, the molecular weight of the thermoplastic polymer must be high enough to induce sufficient entanglement to form microfibrils. In some embodiments, the molecular weight is from about 10,000 to less than 500,000 g/mol.

The microfibrils may be used in nonwoven articles that are desired to be extra soft and/or have better barrier properties.

(3) Material Properties

The diameter of the fiber of the present invention is less than about 200 micrometers (microns), and alternate embodiments can be less than about 100 microns, less than about 50 microns, or less than 30 microns. In one embodiment hereof, the fibers have a diameter of from about 5 microns to about 25 microns. Fiber diameter is controlled by factors well known in the fiber spinning art including, for example, spinning speed and mass through-put in addition to the process set forth herein.

The fibers produced in the present invention may be environmentally degradable depending upon the amount of starch that is present, the polymer used, and the specific configuration of the fiber. "Environmentally degradable" is defined being biodegradable, disintegratable, dispersible, flushable, or compostable or a combination thereof. In the present invention, the fibers, nonwoven webs, and articles may be environmentally degradable.

The fibers described herein are typically used to make disposable nonwoven articles. The articles are commonly flushable. The term "flushable" as used herein refers to materials which are capable of dissolving, dispersing, disintegrating, and/or decomposing in a septic disposal system such as a toilet to provide clearance when flushed down the toilet without clogging the toilet or any other sewage drainage pipe. The fibers and resulting articles may also be aqueous responsive. The term aqueous responsive as used herein means that when placed in water or flushed, an observable and measurable change will result. Typical observations include noting that the article swells, pulls apart, dissolves, or observing a general weakened structure.

The fibers of the present invention can have low brittleness and have high toughness, for example a toughness of about 2MPa or greater. Toughness is defined as the area under the stress-strain curve.

Extensibility or elongation is measured by elongation to break. Extensibility or elongation is defined as being capable of elongating under an applied force, but not necessarily recovering. Elongation to break is measured as the distance the fiber can be stretched until failure. It has also been found that the fibers of the present invention can be highly extensible.

The elongation to break of single fibers are tested according to ASTM standard D3822 except a strain rate of 200%/min is used. Testing is performed on an MTS Synergie 400 tensile testing machine with a 10 N load cell and pneumatic grips. Tests are conducted at a rate of 2 inches/minute on samples with a 1-inch gage length. Samples are pulled to break. Peak stress and % elongation at break are recorded and averaged for 10 specimens.

Nonwoven products produced from multicomponent fibers can also exhibit desirable mechanical properties, particularly, strength, flexibility, softness, and absorbency. Measures of strength include dry and/or wet tensile strength. Flexibility is related to stiffness and can attribute to softness. Softness is generally described as a physiologically perceived attribute which is related to both flexibility and texture. Absorbency relates to the products' ability to take up fluids as well as the capacity to retain them.

(4) Processes

The first step in producing a multi-component fiber can be a compounding or mixing step. In this compounding step, the raw materials are heated, typically under shear. The shearing in the presence of heat can result in a homogeneous melt with proper selection of the composition. The melt is then placed in an extruder where fibers are formed. A collection of fibers is combined together using heat, pressure, chemical binder, mechanical entanglement, and combinations thereof resulting in the formation of a nonwoven web. The nonwoven is then assembled into an article.

Compounding

The objective of the compounding step is to produce a homogeneous melt composition for each component of the fibers. Preferably, the melt composition is homogeneous, meaning that a uniform distribution of ingredients in the melt is present. The resultant melt composition(s) should be essentially free of water to spin fibers. Essentially free is defined as not creating substantial problems, such as causing bubbles to form which may ultimately break the fiber while spinning. The free water content of the melt composition can be about 1% or less, about 0.5% or less, or about 0.15% of less. The total water content includes the bound and free water. Preferably, the total water content (including bound water and free water) is about 1% or less. To achieve this low water content, the starch or polymers may need to be dried before processed and/or a vacuum is applied during processing to remove any free water. The thermoplastic starch, or other components hereof, can be dried at elevated temperatures, such as about 60° C., before spinning. The drying temperature is determined by the chemical nature of a component's constituents. Therefore, different compositions can use different drying temperatures which can to range from 20° C. to 150° C. and are, in general, below the melting temperature of the polymer. Drying of the components may be in series or as discrete steps combined with spinning, such as those known in the art.

In general, any method known in the art or suitable for the purposes hereof can be used to combine the ingredients of the components of the present invention. Typically such techniques will include heat, mixing, and pressure. The particular order or mixing, temperatures, mixing speeds or time, and equipment can be varied, as will be understood by those skilled in the art, however temperature should be controlled such that the starch does not significantly degrade. The resulting melt should be homogeneous.

A suitable method of mixing for a starch and plasticizer blend is as follows:
1. The starch is destructured by addition of a plasticizer. The plasticizer, if solid such as sorbitol or mannitol, can be added with starch (in powder form) into a twin-screw extruder. Liquids such as glycerine, can be combined with the starch via volumetric displacement pumps.
2. The starch is fully destructurized by application of heat and shear in the extruder. The starch and plasticizer mixture is typically heated to 120-180° C. over a period of from about 10 seconds to about 15 minutes, until the starch gelatinizes.
3. A vacuum can applied to the melt in the extruder, typically at least once, to remove free water. Vacuum can be applied, for example, approximately two-thirds of the way down the extruder length, or at any other point desired by the operator.
4. Alternatively, multiple feed zones can be used for introducing multiple plasticizers or blends of starch.
5. Alternatively, the starch can be premixed with a liquid plasticizer and pumped into the extruder.

As will be appreciated by one skilled in the art of compounding, numerous variations and alternate methods and conditions can be used for destructuring the starch and formation of the starch melt including, without limitation, via feed port location and screw extruder profile.

A suitable mixing device is a multiple mixing zone twin screw extruder with multiple injection points. The multiple injection points can be used to add the destructurized starch and the polymer. A twin screw batch mixer or a single screw extrusion system can also be used. As long as sufficient mixing and heating occurs, the particular equipment used is not critical.

An alternative method for compounding the materials comprises adding the plasticizer, starch, and polymer to an extrusion system where they are mixed in progressively increasing temperatures. For example, in a twin screw extruder with six heating zones, the first three zones may be heated to 90°, 120°, and 130° C., and the last three zones will be heated above the melting point of the polymer. This procedure results in minimal thermal degradation of the starch and for the starch to be fully destructured before intimate mixing with the thermoplastic materials.

An example of compounding destructured thermoplastic starch would be to use a Werner & Pfleiderer 30 mm diameter 40:1 length to diameter ratio co-rotating twin-screw extruder set at 250 RPM with the first two heat zones set at 50° C. and the remaining five heating zones set 150° C. A vacuum is attached between the penultimate and last heat section pulling a vacuum of 10 atm. Starch powder and plasticizer (e.g., sorbitol) are individually fed into the feed throat at the base of the extruder, for example using mass-loss feeders, at a combined rate of 30 lbs/hour (13.6 kg/hour) at a 60/40 weight ratio of starch/plasticizer. Processing aids can be added along with the starch or plasticizer. For example, magnesium stearate can be added at a level of 0-1%, by weight, of the thermoplastic starch component.

Spinning

The fibers of the present invention can be made by melt spinning. Melt spinning is differentiated from other spinning, such as wet or dry spinning from solution, where in such alternate methods a solvent is present in the melt and is eliminated by volatilizing or diffusing it out of the extrudate.

Spinning temperatures for the melts can range from about 105° C. to about 300° C., and in some embodiments can be from about 130° C. to about 230° C. The processing temperature is determined by the chemical nature, molecular weights and concentration of each component.

In general, high fiber spinning rates are desired for the present invention. Fiber spinning speeds of about 10 meters/minute or greater can be used. In some embodiments hereof, the fiber spinning speed is from about 100 to about 7,000 meters/minute, or from about 300 to about 3,000 meters/minute, or from about 500 to about 2,000 meters/minute.

The fiber may be made by fiber spinning processes characterized by a high draw down ratio. The draw down ratio is defined as the ratio of the fiber at its maximum diameter (which is typically occurs immediately after exiting the capillary of the spinneret in a conventional spinning process) to the final diameter of the formed fiber. The fiber draw down ratio via either staple, spunbond, or meltblown process will typically be 1.5 or greater, and can be about 5 or greater, about 10 or greater, or about 12 or greater.

Continuous fibers can be produced through, for example, spunbond methods or meltblowing processes. Alternately, non-continuous (staple fibers) fibers can be produced according to conventional staple fiber processes as are well known in the art. The various methods of fiber manufacturing can also be combined to produce a combination technique, as will be understood by those skilled in the art.

The fibers spun can be collected subsequent for formation using conventional godet winding systems or through air drag attenuation devices. If the godet system is used, the fibers can be further oriented through post extrusion drawing at temperatures from about 50° to about 200° C. The drawn fibers may then be crimped and/or cut to form non-continuous fibers (staple fibers) used in a carding, airlaid, or fluidlaid process.

In the process of spinning fibers, particularly as the temperature is increased above 105° C., typically it is desirable for residual water levels to be 1%, by weight of the fiber, or less, alternately 0.5% or less, or 0.15% or less to be present in the various components.

Bicomponent melt spinning equipment is described in U.S. Pat. No. 5,162,074 and is commercially available from, for example, Hills, Inc. located in Melbourne, Fla. USA. Suitable spinnert capillaries for use in spinning to make bicomponent fibers include, for example, capillaries with a length-to diameter ration of about 4 and a diameter of about 0.35 mm, although other capillary dimensions can be used.

The process of spinning fibers and compounding of the components can be done in-line, with compounding, drying and spinning as part of a continuous process and can be the preferred process execution.

The residence time of each component in the spinline can have special significance when a high melting temperatures thermoplastic polymer is chosen to be spun with destructured starch. Spinning equipment can be designed to minimize the exposure of the destructured starch component to high process temperature by minimizing the time and volume of destructured starch exposed in the spinneret. For example, the polymer supply lines to the spinneret can be sealed and separated until introduction into the bicomponent pack. Furthermore, one skilled in the art of bicomponent fiber spinning will understand that the at least two components can be introduced and processed in their separate extruders at different temperatures until introduced into the spinneret.

For example, consider bicomponent spinning of an islands-in-a-sea fiber with a destructured starch sea and polypropylene islands. The destructured starch component extruder profile may be 80° C., 150° C. and 150° C. in the first three zones of a three heater zone extruder with a starch composition similar to B3 of Example 1. The transfer lines and melt pump heater temperatures will also be 150° C. for the starch component. The polypropylene component extruder temperature profile would be 180° C., 230° C. and 230° C. in the first three zones of a three heater zone extruder. The transfer lines and melt pump are heated to 230° C. In this case the spinneret temperature can range from 180° C. to 230° C.

Exposure of Second Component to Second-Component-Removing Solvent

The second component can be removed by exposure of the multicomponent fiber to a solvent in which the second component is removable. Most commonly, the solvent is water, however, any solvent in which the second component is removed when the fiber is placed in the solvent is contemplated. A further example of such a solvent is glycerine. The fibers having the starch removed may be used in nonwoven articles that are desired to be extra soft and/or have better barrier properties. Additionally, because starch is an inexpensive material, the starch and polymer fibers with the starch removed will be a more cost-effective fiber.

The starch component can also be removed by a combination technique where mechanical or hydrodynamic methods can be used to remove the starch in isolation, in series or in combination with a solvent.

The rate of starch removal can be measured by weight loss of the fibers versus time exposed to solvent for the second component. The fibers are removed and dried in the oven for 15 minutes at 115° C. The fibers are then removed from the oven and allowed to cool in an open atmosphere at room temperature for 30 minutes before weighing.

Physical Manipulation of Fibers

Fibers are handled during second component removal or after second component removal. Non-limiting examples of handling include thermodynamic annealing, elongation, contraction splitting, and fabric formation.

An embodiment of the present invention is a process of producing a melt spinnable fiber having a diameter of less than 200 microns, the process comprising compounding a first component comprising a thermoplastic polymer, compounding a second component comprising destructured starch, spinning the first component with the second component to form a fiber having a diameter of less than 200 microns, wherein the second component is not encompassed by another component or components or if encompassed by another component or components to then the second component encompasses a hollow core. A further embodiment of the process includes contacting the fiber with a solvent for the second component wherein the second component is removed from the fiber by exposure to the solvent. In another embodiment, the compounding of the second component may further include an agent selected from the group consisting of an acid substituted vinyl polymer, a polyolefin carboxylic acid copolymer, a polyhydroxyetherester, a polyhydroxyetheramide, a C8-C22 aliphatic saturated or unsaturated carboxylic acid, an aliphatic carboxyamide, and an aromatic carboxyamide, wherein the second component is removed from the fiber by exposure to the solvent at a rate that is slower than that of a fiber lacking the agent. A process that further comprises physically manipulating the fiber prior to complete removal of the second component or after removal of the second component are also aspects of the present invention.

(5) Articles

The fibers hereof may be used for any purposes for which fibers are conventionally used. This includes, without limitation, incorporation into nonwoven substrates. The fibers hereof may be converted to nonwovens by any suitable methods known in the art. Continuous fibers can be formed into a web using industry standard spunbond or meltblown type technologies while staple fibers can be formed into a web using industry standard carding, airlaid, or wetlaid technologies. Typical bonding methods include: calendar (pressure and heat), thru-air heat, mechanical entanglement, hydrodynamic entanglement, needle punching, and chemical bonding and/or resin bonding. The calendar, thru-air heat, and chemical bonding are the preferred bonding methods for the starch and polymer multicomponent fibers. Thermally bondable fibers are required for the pressurized heat and thru-air heat bonding methods.

The fibers of the present invention may also be bonded or combined with other synthetic or natural fibers to make nonwoven articles. The synthetic or natural fibers may be blended together in the forming process or used in discrete layers. Suitable synthetic fibers include fibers made from polypropylene, polyethylene, polyester, polyacrylates, and copolymers thereof and mixtures thereof. Natural fibers include cellulosic fibers and derivatives thereof. Suitable cellulosic fibers include those derived from any tree or vegetation, including hardwood fibers, softwood fibers, hemp, and cotton. Also included are fibers made from processed natural cellulosic resources such as rayon.

The fibers of the present invention may be used to make nonwovens, among other suitable articles. Nonwoven articles are defined as articles that contains greater than 15% of a plurality of fibers that are continuous or non-continuous and physically and/or chemically attached to one another. The nonwoven may be combined with additional nonwovens or films to produce a layered product used either by itself or as a component in a complex combination of other materials, such as a baby diaper or feminine care pad. Preferred articles are disposable, nonwoven articles. The resultant products may find use in one of many different uses. Preferred articles of the present invention include disposable nonwovens for hygiene and medical applications. Hygiene applications include such items as wipes; diapers, particularly the top sheet or back sheet; and feminine pads or products, particularly the top sheet.

EXAMPLES

The examples below further illustrate the present invention. The starches for use in the examples below are STARDRI 1, STARDRI 100, ETHYLEX 2015, or ETHYLEX 2035, all from Staley Chemical Company. The latter Staley materials are substituted starches. The ethylene acrylic acid (EAA) is PRIMACORE 5980I from Dow Chemical. The polypropylene (PP) resin is Basell PROFAX PH-835. The polyethylene (PE) is ASPUN 6811A from Dow Chemical. The poly(L) lactic acid is BIOMER L9000 (Biomer). The polyethylene succinate (PES) is BIONOLLE 1020 from Showa High Polymer (Tokyo, Japan). The polyester is F61HC or 9663 from Eastman Chemical. The glycerine is from Dow Chemical Company, Kosher Grade BU OPTIM* Glycerine 99.7%. The sorbitol is from Archer-Daniels-Midland Co. (ADM), Crystalline NF/FCC 177440-2S. Other polymers having similar chemical compositions that differ in molecular weight, molecular weight distribution, and/or comonomer or defect level can also be used.

Example 1

Thermoplastic starch compositions (TPS'S) are prepared according to the following formulations of Table 1. In Table 1, material 1 represents starch, material 2 represents a plasticizer, and material 3 represents a non-starch thermoplastic polymer.

TABLE 1

| | Composition | | | Composition (by parts) | | |
|---|---|---|---|---|---|---|
| | Material 1 | Material 2 | Material 3 | Material 1 | Material 2 | Material 3 |
| B1 | Staley STARDRI 1 | ADM sorbitol | Dow PRIMACOR E 5980I | 60 | 40 | |
| B2 | Staley STARDRI 1 | ADM sorbitol | Dow PRIMACOR E 5980I | 60 | 40 | 5 |
| B3 | Staley STARDRI 1 | ADM sorbitol | Dow PRIMACOR E 5980I | 60 | 40 | 10 |
| B4 | Staley STARDRI 1 | ADM sorbitol | Dow PRIMACOR E 5980I | 60 | 40 | 15 |
| B5 | Staley STARDRI 1 | ADM sorbitol | Dow PRIMACOR E 5980I | 60 | 40 | 25 |
| B6 | Staley STARDRI 1 | Dow Glycerine | Dow PRIMACOR E 5980I | 60 | 40 | |
| B7 | Staley STARDRI 1 | Dow Glycerine | Dow PRIMACOR E 5980I | 60 | 40 | 5 |
| B8 | Staley STARDRI 1 | Dow Glycerine | Dow PRIMACOR E 5980I | 60 | 40 | 10 |
| B9 | Staley STARDRI 1 | Dow Glycerine | Dow PRIMACOR E 5980I | 60 | 40 | 15 |
| B10 | Staley STARDRI 1 | Dow Glycerine | Dow PRIMACOR E 5980I | 60 | 40 | 25 |
| B11 | Staley STARDRI 1 | Dow Glycerine + ADM Sorbitol | Dow PRIMACOR E 5980I | 60 | 20 + 20 | |
| B12 | Staley STARDRI 1 | Dow Glycerine + ADM Sorbitol | Dow PRIMACOR E 5980I | 60 | 20 + 20 | 5 |
| B13 | Staley STARDRI 1 | Dow Glycerine + ADM Sorbitol | Dow PRIMACOR E 5980I | 60 | 20 + 20 | 25 |
| B14 | Staley STARDRI 100 | ADM sorbitol | Dow PRIMACOR E 5980I | 70 | 30 | 0 |
| B15 | Staley STARDRI 100 | ADM sorbitol | Dow PRIMACOR E 5980I | 70 | 30 | 15 |
| B16 | Staley STARDRI 100 | ADM sorbitol | Dow PRIMACOR E 5980I | 70 | 30 | 25 |
| B17 | Staley ETHYLEX 2015 | ADM sorbitol | Dow PRIMACOR E 5980I | 60 | 40 | 0 |
| B18 | Staley ETHYLEX 2015 | ADM sorbitol | Dow PRIMACOR E 5980I | 60 | 40 | 15 |
| B19 | Staley ETHYLEX 2035 | ADM sorbitol | Dow PRIMACOR E 5980I | 60 | 40 | 0 |
| B20 | Staley ETHYLEX 2035 | ADM sorbitol | Dow PRIMACOR E 5980I | 60 | 40 | 15 |
| B21 | Staley ETHYLEX 2015 + Staley ETHYLEX 2035 | ADM sorbitol | Dow PRIMACOR E 5980I | 30 + 30 | 40 | 0 |
| B22 | Staley ETHYLEX 2015 + Staley ETHYLEX 2035 | ADM sorbitol + Dow Glycerine | Dow PRIMACOR E 5980I | 30 + 30 | 20 + 20 | 0 |
| B23 | Staley ETHYLEX 2015 + Staley ETHYLEX 2035 | ADM sorbitol | Dow PRIMACOR E 5980I | 30 + 30 | 40 | 15 |
| B24 | Staley ETHYLEX 2015 + Staley ETHYLEX 2035 | ADM sorbitol + Dow Glycerine | Dow PRIMACOR E 5980I | 30 + 30 | 20 + 20 | 15 |
| B25 | Staley ETHYLEX 2015 | Dow Glycerine | Dow PRIMACOR E 5980I | 60 | 40 | 0 |
| B26 | Staley ETHYLEX 2035 | Dow Glycerine | Dow PRIMACOR E 5980I | 60 | 40 | 0 |
| B27 | Staley ETHYLEX 2015 + Staley ETHYLEX 2035 | Dow Glycerine | Dow PRIMACOR E 5980I | 60 | 40 | 0 |
| B28 | Staley ETHYLEX 2015 | Dow Glycerine | Dow PRIMACOR E 5980I | 60 | 40 | 15 |
| B29 | Staley ETHYLEX 2035 | Dow Glycerine | Dow PRIMACOR E 5980I | 60 | 40 | 15 |

The above materials can be prepared in a Werner & Pfleiderer 30 mm diameter 40:1 length to diameter ratio co-rotating twin-screw extruder (although 50 mm Baker and Perkins 25:1 and 40:1 twin screw systems have been used) set at 250 RPM with the first two heat zones set at 50° C. and the remaining zones to 150° C. A vacuum is attached between the penultimate and last heat section pulling a vacuum of 10 atm. The starch powder and sorbitol are individually fed into the feed throat, preferably using mass-loss feeders. Magnesium stearate is preferably added also at 0-1 wt %. The glycerine is injected after the first two heat zones via a heated liquid injection system. The total mass through-put is typically set to 25 lbs/hour, although rates ranging from 5-75 lbs/hour have been used.

The compounded material is extruded onto an air quench conveyor table and pelletized. Before spinning the TPS compositions, they are typically dried, if needed after compounding, to moisture levels below 1 wt % for the best spinning. The most preferred moisture content is below 0.15 wt %.

Example 2

Figure 2A:
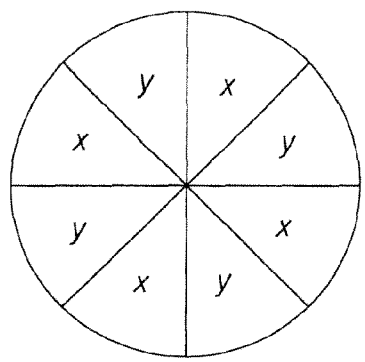
FIG. 2A-FIG. 2B provide schematic drawings illustrating cross-sectional views of bicomponent fibers having a segmented pie configuration.
Figure 2B:
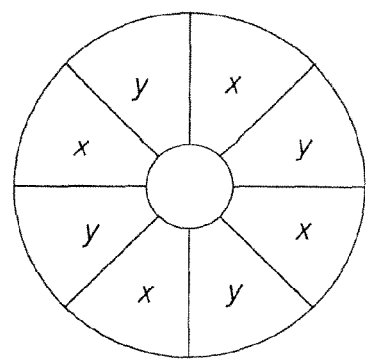
Figure 3:
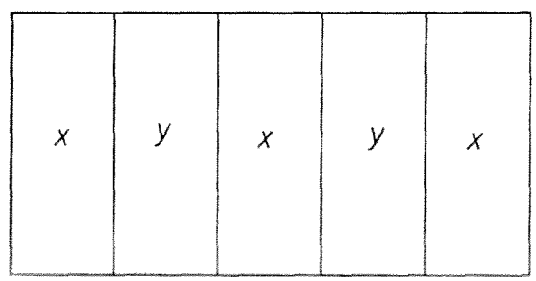
FIG. 3 provides a schematic drawing illustrating a cross-sectional view of a bicomponent fiber having a ribbon configuration.
Figure 4A:
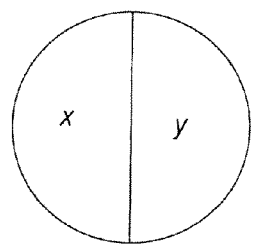
FIG. 4A-FIG. 4E provide schematic drawings illustrating cross-sectional views of bicomponent fibers having a side-by-side configuration.
Figure 4B:
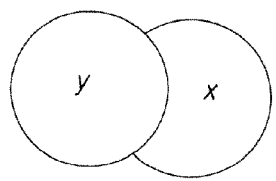
Figure 4C:
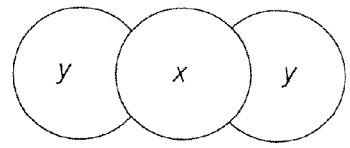
Figure 4D:
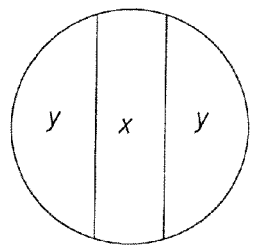
Figure 4E:
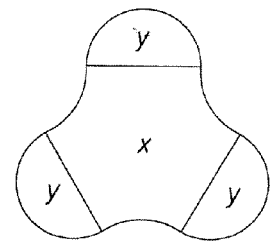

The TPS composition B1 is melt spun with Basell PROFAX PH-835 using an hollow segmented pie bicomponent pattern such as exemplified in FIG. 2B. The melt extrusion temperature is 210° C. The ratio of components ranges from 10:90 to 50:50. The as-spun filaments are placed in water and the TPS immediately dissolves in room temperature water.

Example 3

The TPS composition B1 is melt spun with Basell PROFAX PH-835 using an islands-in-a-sea bicomponent pattern such as exemplified in FIG. 5A or FIG. 5B where the sea component comprises the TPS. The melt extrusion temperature is 210° C. The ratio of components ranges from 30:70 to 80:20. The as-spun filaments are placed in water and the TPS immediately dissolves in room temperature water.

Example 4

Figure 1B:
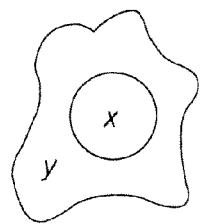
Figure 1C:
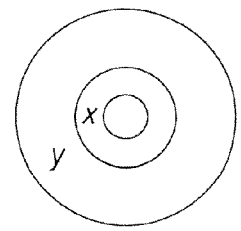
Figure 1D:
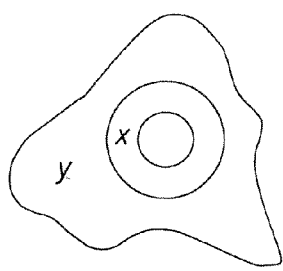
Figure 1E:
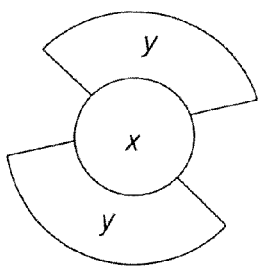
Figure 1F:
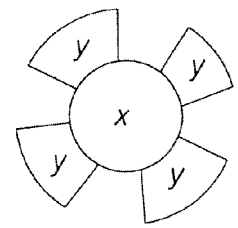
Figure 1G:
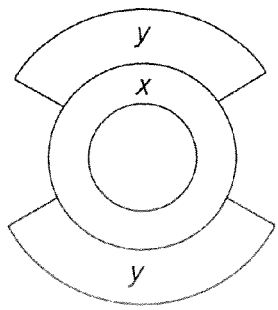
Figure 1H:
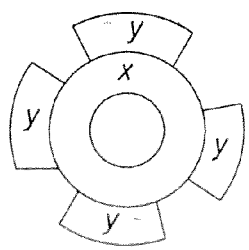
Figure 1I:
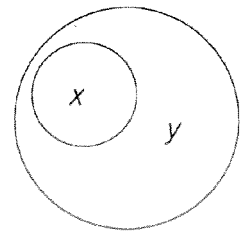

The TPS composition B1 is melt spun with Basell PROFAX PH-835 using a solid sheath/core such as exemplified in FIG. 1A or FIG. 1B with a TPS sheath. The melt extrusion temperature is 210° C. The ratio of components ranges from 10:90 to 50:50. The as-spun filaments are placed in water and the TPS immediately dissolves in room temperature water.

Example 5

The TPS composition B4 is melt spun with Basell PROFAX PH-835 using an hollow segmented pie bicomponent pattern such as exemplified in FIG. 2B. The melt extrusion temperature is 210° C. The ratio of components ranges from 10:90 to 50:50. The as-spun filaments are placed in water and the TPS gradually dissolves in room temperature water over about 15-60 minute time frame. The use of hot water makes it dissolve faster.

Example 6

The TPS composition B4 is melt spun with Basell PROFAX PH-835 using an islands-in-a-sea bicomponent pattern such as exemplified in FIG. 5A or FIG. 5B where the sea component comprises the TPS. The melt extrusion temperature is 210° C. The ratio of components ranges from 30:70 to 80:20. The as-spun filaments are placed in water and the TPS gradually dissolves in room temperature water over about 15-60 minute time frame. The use of hot water makes it dissolve faster.

Example 7

The TPS composition B4 is melt spun with Basell PROFAX PH-835 using a solid sheath/core such as exemplified in FIG. 1A or FIG. 1B with a TPS sheath. The melt extrusion temperature is 210° C. The ratio of components ranges from 10:90 to 50:50. The as-spun filaments are placed in water and the TPS gradually dissolves in room temperature water over about 15-60 minute time frame. The use of hot water makes it dissolve faster.

Example 8

The TPS composition B5 is melt spun with Basell PROFAX PH-835 using an hollow segmented pie bicomponent pattern such as exemplified in FIG. 2B. The melt extrusion temperature is 210° C. The ratio of components ranges from 10:90 to 50:50. The as-spun filaments are placed in water and are relatively stable in room temperature water over a period of several hours. Over a period of several days they can dissolve in water. The use of boiling water makes it dissolve faster.

Example 9

The TPS composition B5 is melt spun with Basell PROFAX PH-835 using an islands-in-a-sea bicomponent pattern such as exemplified in FIG. 5A or FIG. 5B where the sea component comprises the TPS. The melt extrusion temperature is 210° C. The ratio of components ranges from 30:70 to 80:20. The as-spun filaments are placed in water and are relatively stable in room temperature water over a period of several hours. Over a period of several days they can dissolve in water. The use of boiling water makes it dissolve faster.

Example 10

The TPS composition B5 is melt spun with Basell PROFAX PH-835 using a solid sheath/core such as exemplified in FIG. 1A or FIG. 1B with a TPS sheath. The melt extrusion temperature is 210° C. The ratio of components ranges from 10:90 to 50:50. The as-spun filaments are placed in water and are relatively stable in room temperature water over a period of several hours. Over a period of several days they can dissolve in water. The use of boiling water makes it dissolve faster.

Examples 11-30

Further bicomponent fibers can be produced according to Table 2.

TABLE 2

| Example # | Polymer | TPS Composition | Ratio Range | Extrusion Temperature (° C.) | Bicomponent Configuration |
|---|---|---|---|---|---|
| 11 | Basell PROFAX PH-835 | B1-B22 | 70:30 to 10:90 | 190-220 | Islands-in-a-Sea |

TABLE 2-continued

| Example # | Polymer | TPS Composition | Ratio Range | Extrusion Temperature (° C.) | Bicomponent Configuration |
|---|---|---|---|---|---|
| 12 | Basell PROFAX PH-835 | B1-B22 | 70:30 to 10:90 | 190-220 | Hollow Segmented Pie |
| 13 | Basell PROFAX PH-835 | B1-B22 | 70:30 to 10:90 | 190-220 | Segmented Pie |
| 14 | Basell PROFAX PH-835 | B1-B22 | 90:10 to 10:90 | 190-220 | Sheath/Core |
| 15 | Dow ASPUN 6811A | B1-B22 | 70:30 to 10:90 | 170-200 | Islands-in-a-Sea |
| 16 | Dow ASPUN 6811A | B1-B22 | 70:30 to 10:90 | 170-200 | Hollow Segmented Pie |
| 17 | Dow ASPUN 6811A | B1-B22 | 70:30 to 10:90 | 170-200 | Segmented Pie |
| 18 | Dow ASPUN 6811A | B1-B22 | 90:10 to 10:90 | 170-200 | Sheath/Core |
| 19 | PLA | B1-B22 | 70:30 to 10:90 | 190-220 | Islands-in-a-Sea |
| 20 | PLA | B1-B22 | 70:30 to 10:90 | 190-220 | Hollow Segmented Pie |
| 21 | PLA | B1-B22 | 70:30 to 10:90 | 190-220 | Segmented Pie |
| 22 | PLA | B1-B22 | 90:10 to 10:90 | 190-220 | Sheath/Core |
| 23 | BIONOLLE 1020 | B1-B22 | 70:30 to 10:90 | 170-200 | Islands-in-a-Sea |
| 24 | BIONOLLE 1020 | B1-B22 | 70:30 to 10:90 | 170-200 | Hollow Segmented Pie |
| 25 | BIONOLLE 1020 | B1-B22 | 70:30 to 10:90 | 170-200 | Segmented Pie |
| 26 | BIONOLLE 1020 | B1-B22 | 90:10 to 10:90 | 170-200 | Sheath/Core |
| 27 | EASTAR BIO | B1-B22 | 70:30 to 10:90 | 170-200 | Islands-in-a-Sea |
| 28 | EASTAR BIO | B1-B22 | 70:30 to 10:90 | 170-200 | Hollow Segmented Pie |
| 29 | EASTAR BIO | B1-B22 | 70:30 to 10:90 | 170-200 | Segmented Pie |
| 30 | EASTAR BIO | B1-B22 | 90:10 to 10:90 | 170-200 | Sheath/Core |

Examples 31-38

Still further bicomponent fibers can be produced according to Table 3.

TABLE 3

| | | | | | |
|---|---|---|---|---|---|
| 31 | F61HC PET | B6-B10:B25-B29 | 70:30 to 10:90 | 240-280 | Islands-in-a-Sea |
| 32 | F61HC PET | B6-B10:B25-B29 | 70:30 to 10:90 | 240-280 | Hollow Segmented Pie |
| 33 | F61HC PET | B6-B10:B25-B29 | 70:30 to 10:90 | 240-280 | Segmented Pie |
| 34 | F61HC PET | B6-B10:B25-B29 | 90:10 to 10:90 | 240-280 | Sheath/Core |
| 35 | Polyamide 6 | B6-B10:B25-B29 | 70:30 to 10:90 | 240-280 | Islands-in-a-Sea |
| 36 | Polyamide 6 | B6-B10:B25-B29 | 70:30 to 10:90 | 240-280 | Hollow Segmented Pie |
| 37 | Polyamide 6 | B6-B10:B25-B29 | 70:30 to 10:90 | 240-280 | Segmented Pie |
| 38 | Polyamide 6 | B6-B10:B25-B29 | 90:10 to 10:90 | 240-280 | Sheath/Core |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is intended to cover in the appended claims all such changes and modifications that are within the scope of the invention.

What is claimed is:

1. A process of producing a melt spinnable fiber having a diameter of less than 200 microns, comprising:
    compounding a first component comprising a thermoplastic polymer;
    compounding a second component comprising destructured starch;
    spinning the first component with the second component to form a fiber having a diameter of less than 200 microns, wherein the second component is not encompassed by another component or components or if encompassed by another component or components then the second component encompasses a hollow core, and;
    contacting the fiber with a solvent for the second component wherein the second component is removed from the fiber by exposure to the solvent, and wherein the resulting fiber is durable, with a toughness of about 2 MPa or greater.

2. The process of claim 1 wherein the compounding of the second component further includes an agent selected from the group consisting of an acid substituted vinyl polymer, a polyolefin carboxylic acid copolymer, a polyhydroxyether-ester, a polyhydroxyetheramide, a C8-C22 aliphatic saturated or unsaturated carboxylic acid, an aliphatic carboxyamide, and an aromatic carboxyamide, wherein the second component is removed from the fiber by exposure to the solvent at a rate that is slower than that of a fiber lacking the agent.

3. The process of claim 2 further comprising physically manipulating the fiber prior to complete removal of the second component.

* * * * *